United States Patent
Roberts et al.

(10) Patent No.: US 8,156,600 B2
(45) Date of Patent: Apr. 17, 2012

(54) GUM MASSAGING ORAL BRUSH

(75) Inventors: Michael Roberts, Brookfield, CT (US); Thomas Craig Masterman, Brookline, MA (US); Edward H. Park, Sharon, MA (US); Scott Batson, Wakefield, MA (US); Philip Sweeney, Taunton, MA (US); Mingchih M. Tseng, Hingham, MA (US); Stephen C. Witkus, Grafton, MA (US)

(73) Assignee: The Gillette Company, Boston, MA (US)

( * ) Notice: Subject to any disclaimer, the term of this patent is extended or adjusted under 35 U.S.C. 154(b) by 37 days.

(21) Appl. No.: 12/206,926

(22) Filed: Sep. 9, 2008

(65) Prior Publication Data

US 2009/0013484 A1 Jan. 15, 2009

Related U.S. Application Data

(60) Continuation of application No. 11/809,255, filed on May 31, 2007, now abandoned, which is a continuation of application No. 11/248,087, filed on Oct. 12, 2005, now abandoned, which is a continuation of application No. 10/991,911, filed on Nov. 18, 2004, now abandoned, which is a continuation of application No. 10/692,916, filed on Oct. 24, 2003, now abandoned, which is a continuation of application No. 10/036,022, filed on Dec. 26, 2001, which is a division of application No. 09/660,151, filed on Sep. 13, 2000, now abandoned, which is a continuation of application No. 09/351,588, filed on Jul. 12, 1999, now Pat. No. 6,151,745, which is a continuation of application No. 08/730,286, filed on Oct. 30, 1999, now Pat. No. 5,987,688, which is a continuation-in-part of application No. 08/554,931, filed on Nov. 9, 1995, now abandoned.

(51) Int. Cl.
- A46B 9/04 (2006.01)
- A46B 9/06 (2006.01)
- A46B 3/22 (2006.01)
- A61H 13/00 (2006.01)

(52) U.S. Cl. .......... 15/110; 15/167.1; 15/188; 15/207.2; 15/DIG. 6; 601/141

(58) Field of Classification Search .................... 15/110, 15/117, 167.1, 187, 188, 207.2, DIG. 6; 601/141
See application file for complete search history.

(56) References Cited

U.S. PATENT DOCUMENTS 75,421 A * 3/1868 Hayward ........................ 15/117
(Continued)

FOREIGN PATENT DOCUMENTS

CH 460705 10/1968
(Continued)

OTHER PUBLICATIONS

Advisory Action for U.S. Appl. No. 08/730,286, dated Jun. 21, 1999; P&G Case Z-4168R; Masterman et al.; filed Oct. 30, 1996.

(Continued)

*Primary Examiner* — Mark Spisich
(74) *Attorney, Agent, or Firm* — James E. Oehlenschlager; George H. Leal; Vladimir Vitenberg

(57) ABSTRACT

A toothbrush including a head having an elastomeric support member is described herein. The elastomeric support member supports a plurality of upstanding projections. At least a portion of the upstanding projections include non-elastomeric projections and elastomeric projections.

94 Claims, 6 Drawing Sheets

U.S. PATENT DOCUMENTS

| | | | |
|---|---|---|---|
| 90,763 A | 6/1869 | Marshall | |
| 914,501 A | 3/1909 | McEachern | |
| 1,022,920 A * | 4/1912 | Anderson | 15/110 |
| 1,125,532 A | 1/1915 | Himmel | |
| 1,191,556 A | 7/1916 | Blake | |
| 1,251,250 A * | 12/1917 | Libby | 15/110 |
| 1,405,279 A * | 1/1922 | Cassedy | 601/141 |
| 1,494,448 A | 5/1924 | Joseph | |
| 1,526,267 A | 9/1924 | Dessau | |
| 1,588,785 A * | 6/1926 | Van Sant | 15/110 |
| 1,598,224 A * | 8/1926 | Van Sant | 15/167.1 |
| 1,694,636 A * | 12/1928 | Barker | 15/110 |
| 1,696,433 A | 12/1928 | Faubert et al. | |
| 1,707,118 A | 3/1929 | Goldberg | |
| 1,720,017 A | 7/1929 | Touchstone | |
| 1,770,195 A * | 7/1930 | Burlew | 15/167.1 |
| 1,796,893 A | 3/1931 | McVeigh | |
| 1,797,946 A | 3/1931 | Eichel | |
| 1,907,286 A * | 5/1933 | Chott | 15/110 |
| 1,910,414 A | 5/1933 | Varga | |
| 1,924,152 A | 8/1933 | Coney et al. | |
| 1,924,337 A * | 8/1933 | Troupa | 15/244.1 |
| 1,963,389 A * | 6/1934 | Vardeman | 15/188 |
| 1,982,660 A * | 12/1934 | Handy | 15/167.1 |
| 1,993,662 A | 3/1935 | Green | |
| 2,042,239 A | 5/1936 | Planding | |
| 2,129,082 A | 9/1938 | Byrer | |
| 2,139,245 A * | 12/1938 | Ogden | 601/139 |
| 2,154,846 A | 4/1939 | Heymann et al. | |
| 2,155,473 A | 4/1939 | Coleman | |
| 2,172,624 A | 9/1939 | Robert | |
| 2,225,331 A | 12/1940 | Campbell | |
| 2,226,145 A | 12/1940 | Smith | |
| 2,253,210 A | 8/1941 | Psiharis | |
| 2,254,365 A | 9/1941 | Griffith et al. | |
| 2,279,355 A | 4/1942 | Wilensky | |
| 2,326,632 A | 8/1943 | Friedman | |
| 2,328,998 A | 9/1943 | Radford | |
| 2,473,773 A | 6/1949 | West | |
| 2,476,201 A | 7/1949 | Ligoure | |
| 2,512,059 A * | 6/1950 | Haeusser | 15/105 |
| 2,545,814 A * | 3/1951 | Kempster | 15/188 |
| 2,574,654 A | 11/1951 | Moore | |
| 2,637,870 A | 5/1953 | Cohen | |
| 2,640,215 A * | 6/1953 | Borsini | 401/137 |
| 2,819,482 A * | 1/1958 | Applegate | 15/110 |
| 2,882,544 A | 4/1959 | Hadidian | |
| 2,935,755 A | 5/1960 | Ramon et al. | |
| 3,016,554 A | 1/1962 | Peterson | |
| 3,103,027 A | 9/1963 | Birch | |
| 3,128,487 A | 4/1964 | Vallis | |
| 3,230,562 A | 1/1966 | Birch | |
| 3,258,805 A | 7/1966 | Rossnan | |
| 3,295,156 A | 1/1967 | Brant | |
| 3,302,230 A | 2/1967 | Poppelman | |
| 3,316,576 A * | 5/1967 | Urbush | 15/22.1 |
| 3,327,339 A | 6/1967 | Lemelson | |
| 3,359,588 A | 12/1967 | Kobler | |
| 3,403,070 A | 9/1968 | Lewis, Jr. | |
| 3,411,979 A | 11/1968 | Lewis, Jr. | |
| RE26,688 E | 10/1969 | Lemelson | |
| 3,488,788 A | 1/1970 | Robinson | |
| 3,491,396 A * | 1/1970 | Granieri, Jr. et al. | 15/104.94 |
| 3,553,759 A | 1/1971 | Kramer et al. | |
| 3,613,143 A | 10/1971 | Muhler et al. | |
| 3,618,154 A * | 11/1971 | Muhler et al | 15/167.1 |
| 4,033,008 A | 7/1977 | Warren et al. | |
| 4,081,877 A | 4/1978 | Vitale | |
| 4,083,078 A * | 4/1978 | Shimizu | 15/244.1 |
| 4,128,910 A | 12/1978 | Nakata et al. | |
| 4,240,452 A | 12/1980 | Jean | |
| 4,263,691 A | 4/1981 | Pakarnseree | |
| 4,277,862 A * | 7/1981 | Weideman | 15/110 |
| 4,288,883 A | 9/1981 | Dolinsky | |
| 4,356,585 A | 11/1982 | Protell et al. | |
| 4,391,951 A | 7/1983 | Scheetz | |
| 4,403,623 A | 9/1983 | Mark | |
| 5,274,870 A | 1/1984 | Stollman | |
| 4,472,853 A | 9/1984 | Rauch | |
| 4,476,280 A | 10/1984 | Poppe et al. | |
| 4,480,351 A | 11/1984 | Koffler | |
| 4,525,531 A | 6/1985 | Zukosky et al. | |
| 4,545,087 A | 10/1985 | Nahum | |
| 4,573,920 A | 3/1986 | D'Argembeau | |
| 4,585,416 A | 4/1986 | DeNiro et al. | |
| 4,603,166 A | 7/1986 | Poppe et al. | |
| 4,616,064 A | 10/1986 | Zukosky et al. | |
| 4,617,342 A | 10/1986 | Poppe et al. | |
| 4,617,694 A | 10/1986 | Bori | |
| 4,623,495 A | 11/1986 | Degoix et al. | |
| 4,628,564 A | 12/1986 | Youssef | |
| 4,633,542 A | 1/1987 | Taravel | |
| 4,646,381 A | 3/1987 | Weihrauch | |
| 4,672,706 A | 6/1987 | Hill | |
| 4,694,844 A | 9/1987 | Berl et al. | |
| 4,712,267 A | 12/1987 | Cheng | |
| 4,802,255 A | 2/1989 | Breuer et al. | |
| 4,827,550 A | 5/1989 | Graham et al. | |
| 4,833,194 A | 5/1989 | Kuan et al. | |
| 4,845,795 A | 7/1989 | Crawford et al. | |
| 4,852,202 A | 8/1989 | Ledwitz | |
| 4,882,803 A | 11/1989 | Rogers et al. | |
| 4,894,880 A | 1/1990 | Aznavoorian | |
| 5,020,179 A | 6/1991 | Scherer | |
| 5,021,475 A | 6/1991 | Isayev | |
| 5,034,450 A | 7/1991 | Betz et al. | |
| 5,040,260 A * | 8/1991 | Michaels | 15/167.1 |
| 5,070,567 A | 12/1991 | Holland | |
| 5,088,145 A | 2/1992 | Whitefield | |
| 5,114,214 A | 5/1992 | Barman | |
| 5,137,039 A | 8/1992 | Klinkhammer | |
| 5,171,633 A | 12/1992 | Muramoto et al. | |
| 5,230,118 A | 7/1993 | Chamma | |
| 5,242,235 A | 9/1993 | Li | |
| D345,054 S | 3/1994 | Spence, Jr. | |
| 5,291,878 A | 3/1994 | Lombardo et al. | |
| 5,313,909 A | 5/1994 | Tseng et al. | |
| 5,325,560 A | 7/1994 | Pavone et al. | |
| 5,334,646 A | 8/1994 | Chen | |
| D350,851 S | 9/1994 | Spence, Jr. | |
| 5,350,219 A | 9/1994 | Shou-Jen | |
| 5,360,025 A | 11/1994 | Klinkhammer | |
| 5,360,026 A | 11/1994 | Klinkhammer | |
| 5,535,474 A | 7/1996 | Salazar | |
| 5,604,951 A | 2/1997 | Shipp | |
| 5,628,082 A | 5/1997 | Moskovich | |
| 5,669,097 A | 9/1997 | Klinkhammer | |
| 5,723,543 A | 3/1998 | Modic | |
| 5,735,011 A | 4/1998 | Asher | |
| 5,802,656 A | 9/1998 | Dawson et al. | |
| 5,842,249 A | 12/1998 | Sato | |
| 5,896,614 A | 4/1999 | Flewitt | |
| 5,930,860 A * | 8/1999 | Shipp | 15/110 |
| 5,970,564 A | 10/1999 | Inns et al. | |
| 5,987,688 A | 11/1999 | Roberts et al. | |
| 6,067,684 A | 5/2000 | Kweon | |
| 6,151,745 A | 11/2000 | Roberts et al. | |
| 6,161,245 A | 12/2000 | Weihrauch | |
| 6,276,019 B1 | 8/2001 | Leversby et al. | |
| 6,334,232 B1 | 1/2002 | Sato | |
| 6,408,476 B1 | 6/2002 | Cann | |
| 6,463,618 B1 | 10/2002 | Zimmer | |
| 477,465 A1 | 7/2003 | Reilly et al. | |
| 6,886,207 B1 | 5/2005 | Solanki | |
| 531,809 A1 | 11/2006 | Li | |
| 2001/0014991 A1 | 8/2001 | Halm et al. | |
| 2002/0084550 A1 | 7/2002 | Roberts et al. | |
| 2004/0087882 A1 | 5/2004 | Roberts et al. | |
| 2005/0000043 A1 | 1/2005 | Chan et al. | |
| 2005/0086753 A1 | 4/2005 | Masterman et al. | |
| 2005/0166341 A1 | 8/2005 | Solanki | |
| 2006/0059642 A1 | 3/2006 | Solanki | |
| 2006/0085931 A1 | 4/2006 | Masterman et al. | |
| 2006/0130257 A1 | 6/2006 | Cann | |
| 2006/0242778 A1 | 11/2006 | Solanki | |
| 2007/0234496 A1 | 10/2007 | Roberts | |

| | | | |
|---|---|---|---|
| 2009/0025162 | A1 | 1/2009 | Chan |
| 2009/0044357 | A1 | 2/2009 | Chan |
| 2009/0193604 | A1 | 8/2009 | Pfenniger et al. |

FOREIGN PATENT DOCUMENTS

| | | | |
|---|---|---|---|
| DE | 188848 | | 4/1956 |
| DE | 35 29 953 | | 3/1987 |
| DE | 36 28 722 | A1 | 2/1988 |
| DE | 9318148.5 | | 5/1994 |
| DE | 9400231.2 | | 5/1994 |
| DE | 9400926.0 | | 5/1994 |
| EP | 0 360 766 | A1 | 3/1990 |
| EP | 360766 | * | 3/1990 |
| FR | 442832 | | 9/1912 |
| FR | 920 155 | | 3/1947 |
| FR | 1075171 | | 8/1952 |
| FR | 2 541 100 | | 8/1984 |
| FR | 2599361 | | 8/1985 |
| GB | 2 137 080 | | 10/1984 |
| IT | 592300 | | 4/1959 |
| JP | 61-090877 | A | 5/1986 |
| JP | 1-72128 | | 5/1989 |
| JP | 02-180203 | A | 7/1990 |
| JP | 2-143036 | * | 12/1990 |
| JP | 02-143036 | U | 12/1990 |
| JP | 05-069342 | A | 3/1993 |
| JP | 5-76416 | | 3/1993 |
| JP | 05-096597 | A | 4/1993 |
| JP | 05-123222 | A | 5/1993 |
| JP | 2533441 | | 6/1996 |
| JP | 2533443 | | 6/1996 |
| JP | 2533445 | | 6/1996 |
| JP | 2781861 | | 5/1998 |
| JP | 2000 300342 | A | 10/2000 |
| JP | 2000-308524 | | 11/2000 |
| KR | 71 844 | | 6/1971 |
| WO | WO 91/05088 | | 4/1991 |
| WO | WO 92/04589 | | 3/1992 |
| WO | WO 94/09676 | | 5/1994 |
| WO | WO 96/15696 | | 5/1996 |
| WO | WO 96/23431 | | 8/1996 |
| WO | WO 96/28994 | | 9/1996 |
| WO | WO 98/18364 | A1 | 5/1998 |

OTHER PUBLICATIONS

Office Action for U.S. Appl. No. 08/730,286, dated Apr. 12, 1999; P&G Case Z-4168R; Masterman et al.; filed Oct. 30, 1996.
Office Action for U.S. Appl. No. 08/730,286, dated Oct. 22, 1998; P&G Case Z-4168R; Masterman et al.; filed Oct. 30, 1996.
Office Action for U.S. Appl. No. 08/730,286, dated May 4, 1998; P&G Case Z-4168R; Masterman et al.; filed Oct. 30, 1996.
Office Action for U.S. Appl. No. 09/351,588, dated Feb. 28, 2000; P&G Case Z-4168C; Masterman et al.; filed Jul. 12, 1999.
Office Action for U.S. Appl. No. 09/660,151, dated Aug. 31, 2001; P&G Case Z-4168C2; Masterman et al.; filed Sep. 13, 2000.
Office Action for U.S. Appl. No. 09/660,151, dated Mar. 21, 2001; P&G Case Z-4168C2; Masterman et al.; filed Sep. 13, 2000.
Office Action for U.S. Appl. No. 09/660,151, dated Feb. 7, 2001; P&G Case Z-4168C2; Masterman et al.; filed Sep. 13, 2000.
Examiner's Answer for U.S. Appl. No. 10/692,916, dated Sep. 12, 2008; P&G Case Z-4168C3; Masterman et al.; filed Oct. 24, 2003.
Office Action for U.S. Appl. No. 10/692,916, dated Dec. 26, 2007; P&G Case Z-4168C3; Masterman et al.; filed Oct. 24, 2003.
Office Action for U.S. Appl. No. 10/692,916, dated Jan. 13, 2007; P&G Case Z-4168C3; Masterman et al.; filed Oct. 24, 2003.
Office Action for U.S. Appl. No. 10/692,916, dated May 19, 2006; P&G Case Z-4168C3; Masterman et al.; filed Oct. 24, 2003.
Office Action for U.S. Appl. No. 10/692,916, dated Oct. 31, 2005; P&G Case Z-4168C3; Masterman et al.; filed Oct. 24, 2003.
Office Action for U.S. Appl. No. 10/692,916, dated May 17, 2005; P&G Case Z-4168C3; Masterman et al.; filed Oct. 24, 2003.
Office Action for U.S. Appl. No. 10/692,916, dated Aug. 13, 2004; P&G Case Z-4168C3; Masterman et al.; filed Oct. 24, 2003.
Office Action for U.S. Appl. No. 10/692,916, dated May 18, 2004; P&G Case Z-4168C3; Masterman et al.; filed Oct. 24, 2003.

Examiner's Answer for U.S. Appl. No. 10/991,911, dated Sep. 11, 2008; P&G Case Z-4168C4; Masterman et al.; filed Nov. 18, 2004.
Office Action for U.S. Appl. No. 10/991,911, dated Dec. 20, 2007; P&G Case Z-4168C4; Masterman et al.; filed Nov. 18, 2004.
Office Action for U.S. Appl. No. 10/991,911, dated Jan. 17, 2007; P&G Case Z-4168C4; Masterman et al.; filed Nov. 18, 2004.
Office Action for U.S. Appl. No. 10/991,911, dated Aug. 2, 2006; P&G Case Z-4168C4; Masterman et al.; filed Nov. 18, 2004.
Examiner's Answer for U.S. Appl. No. 10/991,911, dated Jul. 10, 2006; P&G Case Z-4168C4; Masterman et al.; filed Nov. 18, 2004.
Office Action for U.S. Appl. No. 10/991,911, dated Dec. 22, 2005; P&G Case Z-4168C4; Masterman et al.; filed Nov. 18, 2004.
Office Action for U.S. Appl. No. 10/991,911, dated Jul. 12, 2005; P&G Case Z-4168C4; Masterman et al.; filed Nov. 18, 2004.
Office Action for U.S. Appl. No. 10/991,911, dated Mar. 28, 2005; P&G Case Z-4168C4; Masterman et al.; filed Nov. 18, 2004.
Examiner's Answer for U.S. Appl. No. 11/248,087, dated Oct. 1, 2008; P&G Case Z-4168C5; Masterman et al.; filed Oct. 12, 2005.
Office Action for U.S. Appl. No. 11/248,087, dated Dec. 13, 2007; P&G Case Z-4168C5; Masterman et al.; filed Oct. 12, 2005.
Office Action for U.S. Appl. No. 11/248,087, dated Feb. 9, 2007; P&G Case Z-4168C5; Masterman et al.; filed Oct. 12, 2005.
Office Action for U.S. Appl. No. 11/248,087, dated Jun. 15, 2006; P&G Case Z-4168C5; Masterman et al.; filed Oct. 12, 2005.
Office Action for U.S. Appl. No. 11/809,255, dated Jun. 27, 2008; P&G Case Z-4168C6; Roberts et al.; filed May 31, 2007.
Office Action for U.S. Appl. No. 11/809,255, dated Dec. 26, 2007; P&G Case Z-4168C6; Roberts et al.; filed May 31, 2007.
PCT International Search Report dated Mar. 17, 1997.
Plastics Extrusion Technology Handbook, Chapter 7, Coextrusion and Dual-Extrusion Technology, pp. 168-189.
Modern Plastics Encyclopedia, 67: 168-175, 1990.
Pebax 3533 SA 00, "base polymer for structural hot melt adhesives".
Product literature, Kraton Polymers, pp. 13-21.
European equivalent EP 0918477 Opposition Documents.
AU 148045 S Industrial Design Application (The Procter & Gamble Company), Jun. 4, 2002, [online], [retrieved on May 29, 2006] Retrieved from the Australian Government IP Australia Design Database using the Internet URL: http:www.ipaustralia.gov.au.
Brochure, "Extrusion Lines for the Production of Monofilaments," pp. 2-12, 1989.
"Plastics Determination of flexural properties," British Standard, BS EN ISO 178:2003, Apr. 9, 2003.
"Standard Test Methods for Flexural Properties of Unreinforced and Reinforced Plastics and Electrical Insulating Materials [Metric]", American Society for Testing Materials, Designation: D 790M-93 Metric, pp. 1-9, Undated.
"Standard Terminology Relating to Plastics", American Society for Testing Materials, Designation: D883-00, pp. 1-15, Undated.
Hendricks et al., "Rubber-Related Polymers I. Thermoplastic Elastomers", Rubber Technology, pp. 515-533, undated.
"Santoprene Rubber Physical Properties Guide, Tensile Properties, Dynamic Mechanical Properties, Tension and Compression Set, Fatigue Resistance," Advanced Elastomer Systems, pp. 2-19, Undated.
Office Action for U.S. Appl. No. 11/479,767 dated Dec. 7, 2006; P&G Case CM1935CCC; Solanki; filed Jun. 30, 2006.
Office Action for U.S. Appl. No. 11/479,767 dated Aug. 8, 2008; P&G Case CM1935CCC; Solanki; filed Jun. 30, 2006.
Office Action for U.S. Appl. No. 11/479,767 dated May 8, 2007; P&G Case CM1935CCC; Solanki; filed Jun. 30, 2006.
Office Action for U.S. Appl. No. 11/479,767 dated Dec. 13, 2007; P&G Case CM1935CCC; Solanki; filed Jun. 30, 2006.
Office Action for U.S. Appl. No. 11/269,959 dated Jan. 10, 2006; P&G Case CM1935CC; Solanki; filed Nov. 9, 2005.
Office Action for U.S. Appl. No. 11/071,024 dated Jun. 9, 2005; P&G Case CM1935C; Solanki; filed May 2, 2005.
Office Action for U.S. Appl. No. 09/979,933 dated Aug. 13, 2003; P&G Case CM1935; Solanki; filed Jun. 9, 2000.

Office Action for U.S. Appl. No. 09/979,933 dated Mar. 12, 2004; P&G Case CM1935; Solanki; filed Jun. 9, 2000.
Office Action for U.S. Appl. No. 12/722,430 dated Sep. 24, 2010; P&G Case CM1935CCCC; Solanki; filed Mar. 11, 2010.

Office Action for U.S. Appl. No. 12/828,653 dated Jul. 19, 2011; P&G Case Z-3710ED; Braun et al.; filed Jul. 1, 2010.

* cited by examiner

GUM MASSAGING ORAL BRUSH

CROSS REFERENCE TO RELATED APPLICATION

This application is a continuation (and claims the benefit of priority under 35 U.S.C. §120) of U.S. application Ser. No. 11/809,255, filed on May 31, 2007, now abandoned; which is a continuation of pending U.S. application Ser. No. 11/248,087, filed Oct. 12, 2005, which is a continuation of U.S. application Ser. No. 10/991,911, filed Nov. 18, 2004; which is a continuation of pending U.S. application Ser. No. 10/692,916, filed Oct. 24, 2003; which is a continuation of pending U.S. application Ser. No. 10/036,022, filed Dec. 26, 2001; which is a divisional of U.S. application Ser. No. 09/660,151, filed Sep. 13, 2000, now abandoned; which is a continuation of U.S. application Ser. No. 09/351,588, filed Jul. 12, 1999, now U.S. Pat. No. 6,151,745; which is a continuation of U.S. application Ser. No. 08/730,286, filed Oct. 30, 1996, now U.S. Pat. No. 5,987,688; which is a continuation-in-part of Ser. No. 08/554,931, filed Nov. 9, 1995, now abandoned, each of which is incorporated herein by reference.

FIELD OF THE INVENTION

The invention relates to oral brushes and bristles for use in oral brushes.

BACKGROUND OF THE INVENTION

Most humans suffer from tooth decay and/or gingivitis caused by bacteria in the mouth. As a result, decreasing the amount of plaque in the mouth has long been the target of persons working in the health care field. A common way of minimizing the plaque in the mouth is to brush the teeth regularly.

However, the benefits of frequent brushing can be accompanied in some instances by deleterious side effects such as irritation, abrasion and even recession of the gums. These side effects may, in part, result from excessive stiffness and/or sharpness of the toothbrush bristles.

Another common way of improving oral health is by massaging the gums to stimulate the gingival tissue. Conventional toothbrushes tend to have limited effectiveness for gum-massaging, and thus often a separate gum-massaging procedure, using a gum-massaging tool, is required to ensure good oral health.

Endeavors have been made to reduce gum irritation and/or provide a gum-massaging effect by replacing some or all of the toothbrush bristles with rubber or synthetic rubber pins. See, e.g., U.S. Pat. No. 4,288,883.

SUMMARY OF THE INVENTION

A toothbrush in accordance with the present invention provides good cleaning of the teeth of the user. In one embodiment, a toothbrush constructed in accordance with the present invention includes a body comprising a handle and a head, a spacer, a first elastomeric element and a second elastomeric element, a least one cleaning element, and a first group of cleaning elements. The head has a recess, a top surface, a proximal area and a distal area. The proximal area is closer to the handle than the distal area. The head further includes a longitudinal axis and a lateral axis which is perpendicular to the longitudinal axis.

The spacer is attached to a portion of the head. The spacer has a first surface and a second surface opposed to the first surface, and the spacer is disposed in the recess. The first surface of the spacer is substantially contiguous with the top surface of the head.

The first elastomeric element and the second elastomeric element laterally spaced apart from the first elastomeric element. The at least one cleaning element is spaced laterally inboard of the first elastomeric element or the second elastomeric element, and the at least one cleaning element extends through the spacer. The first group of cleaning elements is disposed in the distal area, and each of the first group of cleaning elements extends away from the first surface of the spacer.

In another embodiment, a toothbrush constructed in accordance with the present invention comprises a body having a handle and a head, a spacer, a plurality of bristle tufts, a first plurality of elastomeric elements and a second plurality of elastomeric elements. The head has a recess therein, a top surface and a longitudinal axis.

The spacer has a first surface and a second surface opposed to the first surface. The spacer is disposed in the recess such that the first surface of the spacer is substantially contiguous with the top surface of the head.

The plurality of bristle tufts extend away from the first surface of the spacer, and each of the plurality of bristle tufts extends through the spacer. The first plurality of elastomeric elements and the second plurality of elastomeric elements extend away from the first surface of the spacer. The second plurality of elastomeric elements are longitudinally spaced from the first plurality of elastomeric elements, and at least some of the plurality of bristle tufts are longitudinally spaced from the first plurality of elastomeric elements or the second plurality of elastomeric elements.

In another embodiment, a toothbrush constructed in accordance with the present invention includes a body having a handle and a head, a spacer, a plurality of bristle tufts and a plurality of elastomeric elements. The head has a recessed area and a top surface adjacent the recessed area.

The spacer has a first surface and a second surface opposite the first surface. The spacer is disposed in the recessed area such that the first surface of the spacer is substantially contiguous to the top surface of the head.

The plurality of bristle tufts extend away from the first surface of the spacer and extend through the spacer. The plurality of elastomeric elements including a first pair of elastomeric elements, a second pair of elastomeric elements, and a third pair of elastomeric elements. An elastomeric element of each pair is laterally spaced apart from another elastomeric element of the same pair. The first pair, second pair, and third pair of elastomeric elements are longitudinally spaced apart.

In yet another embodiment, a toothbrush constructed in accordance with the present invention comprises a body have a handle and a head, a spacer, a plurality of non-elastomeric cleaning elements, a first pair of elastomeric elements, and a second pair of elastomeric elements. The head has a longitudinal axis and a lateral axis and a recess.

The spacer has a first surface and a second surface opposite the first surface. The spacer is disposed in the recess such that the first surface of the spacer is substantially contiguous with a top surface of the head.

The plurality of non-elastomeric cleaning elements extend through the spacer. The first pair of elastomeric elements are longitudinally spaced from one another, and a second pair of elastomeric elements are longitudinally spaced from one another. The first pair and the second pair of elastomeric elements are laterally spaced apart. At least one of the plurality of non-elastomeric cleaning elements is disposed laterally between the first pair of elastomeric elements and the second pair of elastomeric elements.

In yet another embodiment, a toothbrush constructed in accordance with the present invention comprises a body having a handle and a head, a spacer, and a plurality of bristle tufts. The head has a recess therein. The head also includes a proximal area and a distal area which is disposed adjacent a farthest point from the handle. The spacer has a first surface and a second surface opposite the first surface. The spacer is disposed in the recess. The plurality of bristle tufts are disposed in the distal area and each of the plurality of bristle tufts extends away from the first surface of the spacer.

In yet another embodiment, a toothbrush constructed in accordance with the present invention comprises a body having a handle and a head, a spacer, and a plurality of bristle tufts. The head has a recess. The spacer has a first surface and a second surface opposite the first surface, and the first surface is the outer surface of the spacer. The plurality of bristle tufts extend away from the first surface of the spacer and all bristle tufts of the toothbrush extend away from the first surface of the spacer.

DETAILED DESCRIPTION

Figure 1:
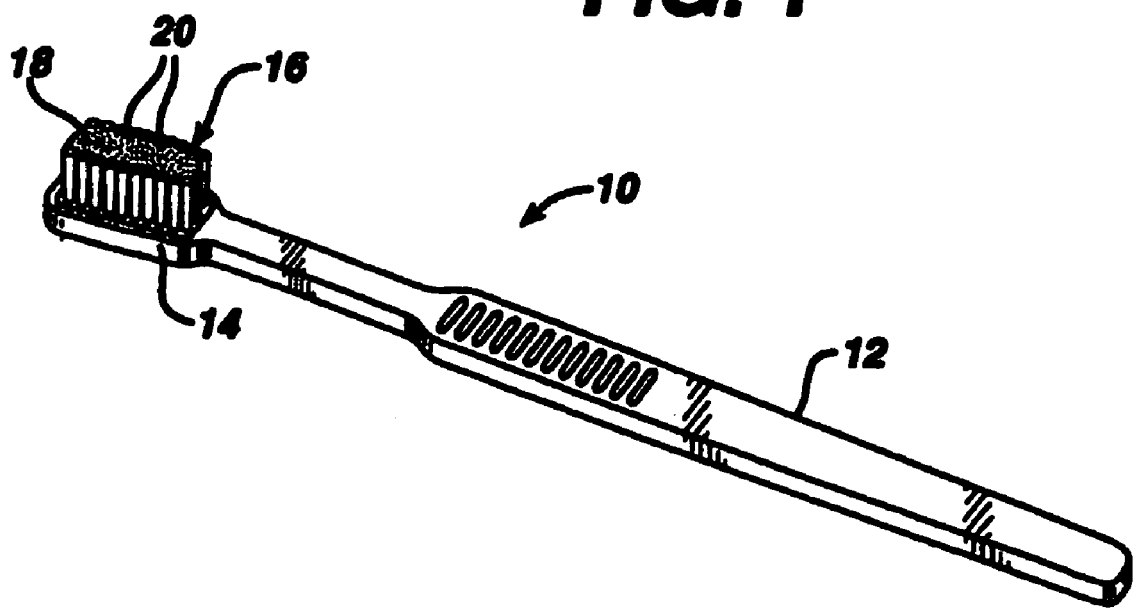
FIG. 1 is a perspective view of a oral brush.

Referring to FIG. 1, a toothbrush 10 includes a plastic body having a handle 12 and a head 14 attached to a bristle portion 16.

The body of the toothbrush is formed by conventional methods well-known in the art. The handle is shaped to be grasped by a hand, but alternatively can be shaped to fit into an electric toothbrush. The configuration of the head can vary and may be rectangular, oval, diamond-shaped, or any other shape, with bristles which are trimmed flat, serrated, v-shaped, convex curved, or any other desired topography, as is well known in the art. The shape and size of handle 12 and head 14 can vary and the axes of the handle and head may be on the same or a different plane. It may be desired to provide a larger head than is conventional, in order to provide extra room for the thermoplastic elastomer bristles, while still retaining the standard number of non-elastomeric bristles.

Figure 2:
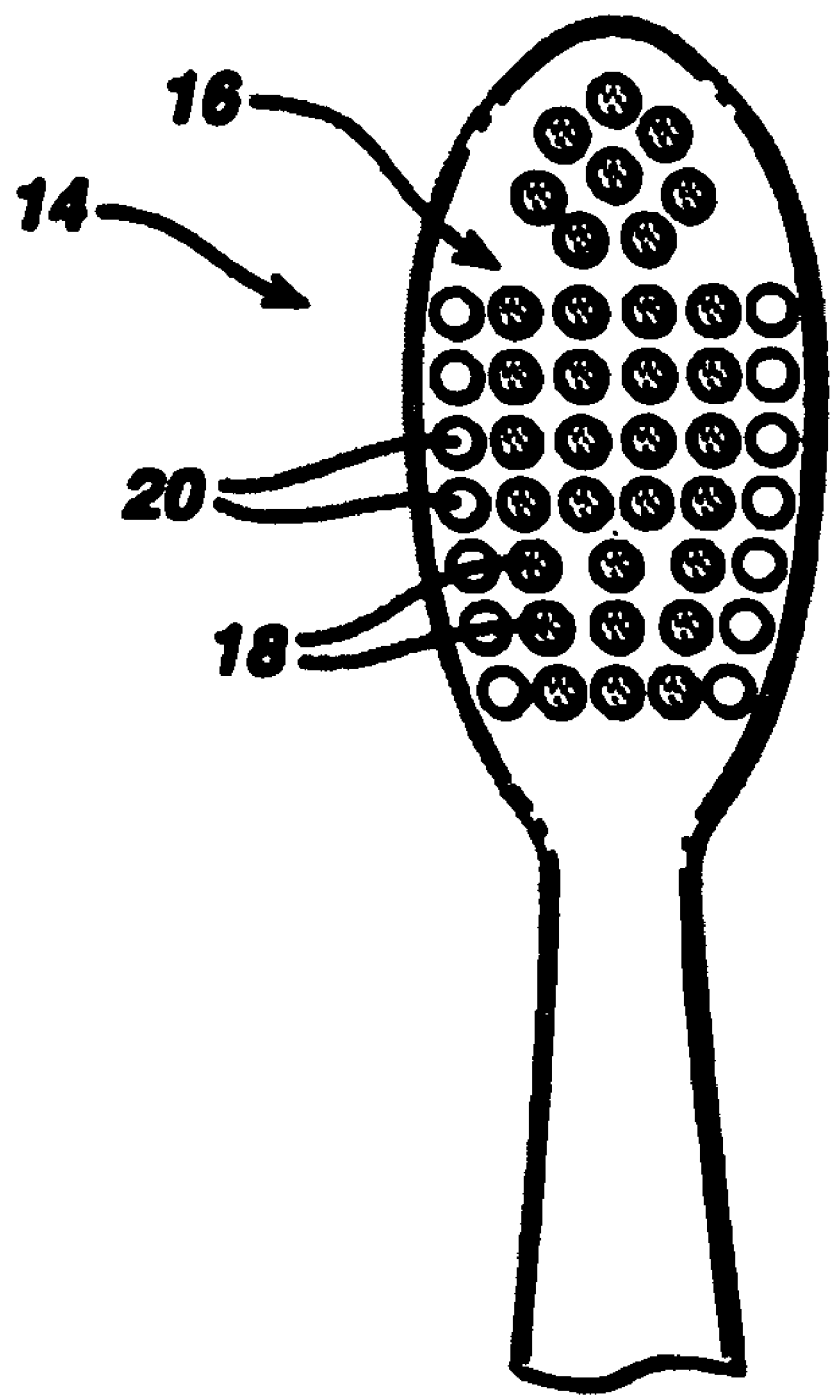
FIG. 2 is a schematic top plan view of the head of an oral brush according to one embodiment of the invention.
Figure 3:
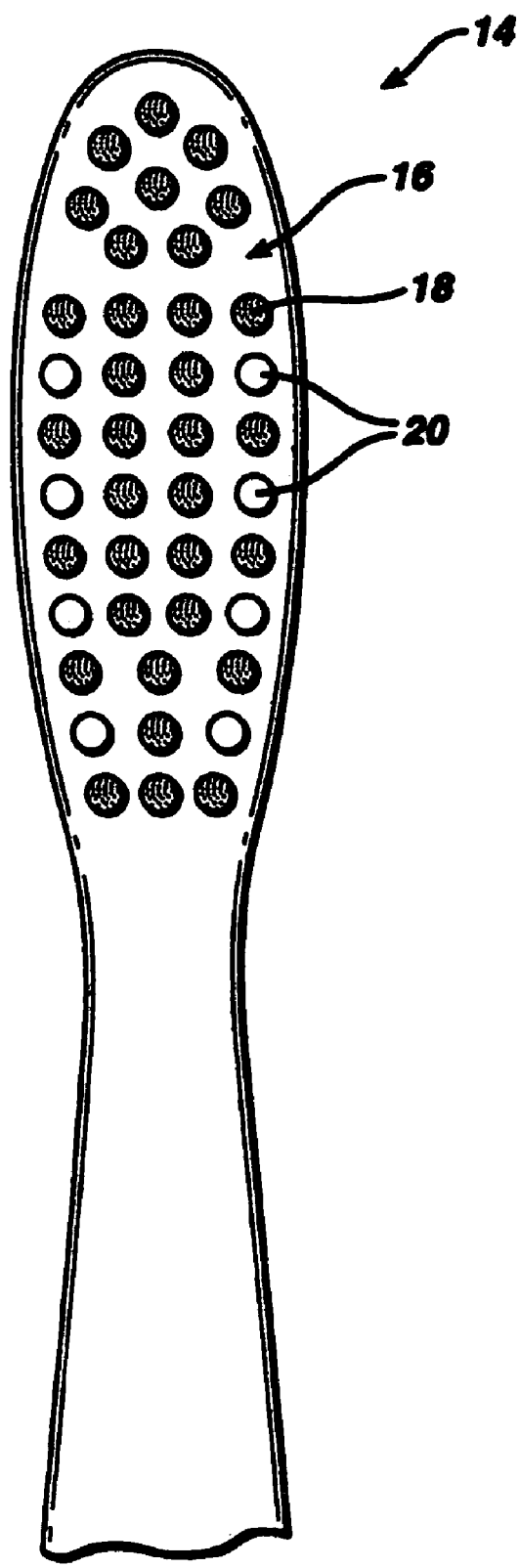
FIG. 3 is a schematic top plan view of the head of an oral brush according to another embodiment of the invention.

Brush portion 16 includes a number of non-elastomeric bristles 18 and a number of elastomeric bristles 20. Preferably, as shown in FIG. 2, the non-elastomeric bristles extend from the central portion of the head 14 and the elastomeric bristles are disposed around the outer perimeter of the head 14, surrounding the non-elastomeric bristles. Another possible arrangement is shown in FIG. 3.

The non-elastomeric bristles are formed of tufts of individual filaments attached to the head in manners known to the art. The elastomeric bristles are formed of tufts of one or more filaments of thermoplastic elastomer. If a single filament is used per tuft, the filament preferably has a diameter that is half that of a standard pre-cored tuft hole, e.g., 33 mil for a 66-mil pre-cored hole, so that the filament can be folded and staple tufted into the hole.

Alternatively, some or all of the bristles are formed of a mixture of elastomeric and non-elastomeric polymers. The elastomeric material is selected from the group consisting of thermoplastic elastomers and vulcanized rubber-type polymers. In both cases, the ratio of the elastomer to the non-elastomeric material is preferably from 10:90-90:10. Preferred bristle diameters range from 3-100 mil (tapered or untapered), depending on the mixture used and elastomer and non-elastomeric material chosen as would be understood by one skilled in the art.

Suitable filaments formed of a blend of elastomeric and non-elastomeric include, but are not limited to the following:

| Composition | Processing Temp | Drawdown Ratio | Diameter | Bend Recovery |
|---|---|---|---|---|
| 30% Pebax 2533 70% Zytel 151L | 250° C. | 4:1 | 8 mil | 95% |
| 30% Pebax 2533 70% Zytel 151L | 250° C. | 4:1 | 7 mil | 95% |

Such a mixture can be compounded using standard processing procedures such as a single screw or twin screw extruder or dry blending.

Suitable thermoplastic elastomers are those which have sufficient stiffness and hardness for effective gum massage and to resist tearing and/or excessive wear during use, while being sufficiently soft to provide comfort and avoid gum irritation during gum massage. Suitable thermoplastic elastomers include polyetheramides, e.g., PEBAX polymers (ELF Atochem); polyesters, e.g., HYTREL polymers (DuPont); styrene-ethylene-butylene-styrene block copolymers, styrene-ethylene-propylene-styrene block copolymers, styrene-butadiene-styrene block copolymers, and styrene-isoprene-styrene block copolymers, e.g., KRATON rubbers (Shell); polyurethanes, e.g., PELLETHANE polyurethanes (DOW); polyolefin elastomers, e.g., SANTOPRENE elastomers (Advanced Elastomer Systems); and mixtures thereof. Poly(ether-amide) block copolymers having the general formula

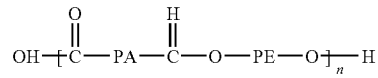

where PA=polyamide segment and PE=polyether segment, commercially available under the tradename PEBAX polymers, are particularly preferred. Of these, a copolymer of nylon 12 and poly(tetramethylene glycol) commercially available under the tradename PEBAX MX-1205 polymer is particularly preferred. Another preferred thermoplastic elastomer comprises a blend of a polyamide sold under the tradename PEBAX 2533 and a block copolymer sold under the tradename KRATON G-6713, preferably containing about 90% of the polyamide and 10% of the block copolymer. This blend provides good softness without tackiness or weakness.

If a relatively soft thermoplastic elastomer is used, a relatively large diameter filament may be needed to provide sufficient durability and stiffness. Such large diameter filaments preferably have a diameter less than about 200 mil, more preferably 30 to 100 mil. If a harder, stiffer thermoplastic elastomer is used, a smaller diameter filament can be used. Generally, suitable thermoplastic elastomers will have a Shore A hardness of at least 30, preferably from about 35 to 55 and a flexural modulus of from about 5 to 100 MPa.

Suitable vulcanized rubber type polymers include, but are not limited to, natural rubber, crosslinked polybutadiene, cross-linked polyacrylates, and blends thereof.

Non-elastomeric bristles 18 may be formed of any material suitable for use in toothbrush bristles. Such materials can also be used as the non-elastomeric component of elastomeric non-elastomeric blend bristles. Preferred materials include nylon 612 and other polyamides. A preferred grade of nylon is available from Whiting Co., Burlington, Vt. under the tradename WYTEX. Preferred polyamides include polythalamides sold by Amoco Performance Products, Inc., under the tradename AMODEL resins. Such polyphthalamides are described in U.S. Pat. Nos. 4,603,166, 4,476,280, and 4,617,342, the disclosures of which are incorporated herein by reference. A particularly preferred polyphthalamide is a crystalline polyphthalamide formed by polymerization of terphthalic acid, isophthalic acid and adipic acid with hexamethylene diamine. Other suitable filaments include acetal resins, polyesters, fluoropolymers, polyacrylates, polysulfones and combinations thereof. Preferred non-elastomeric filaments have a diameter of from about 3 to 10 mil.

Figure 4:
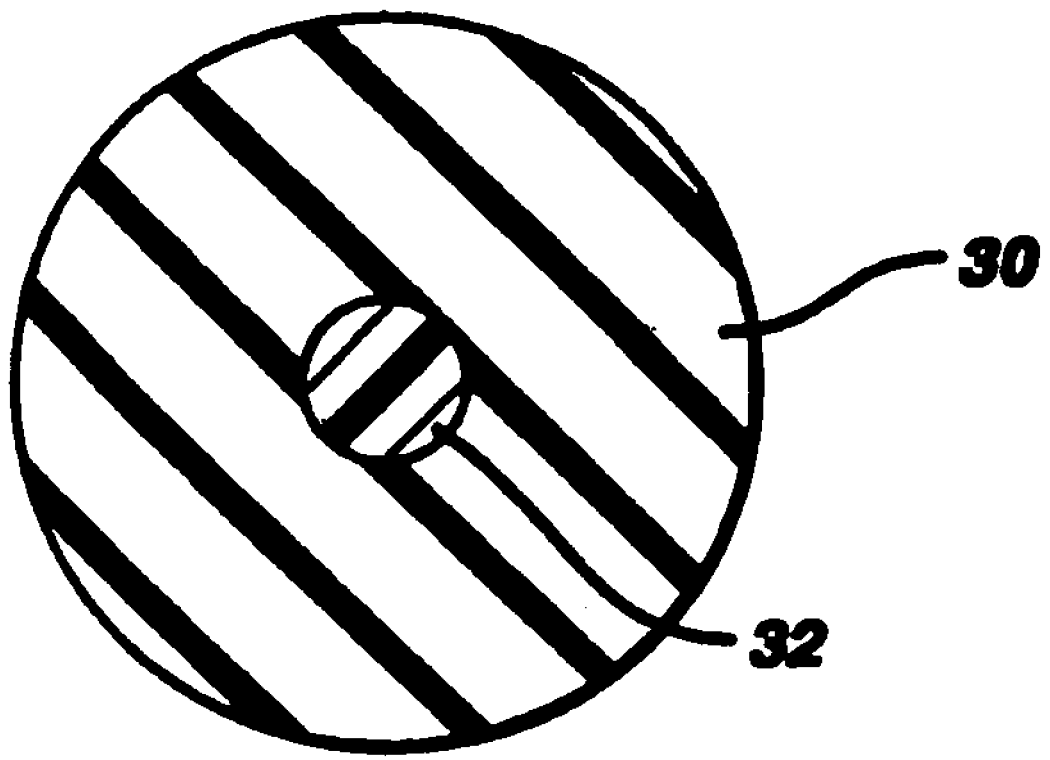
FIG. 4 is a cross-sectional top view of a co-extruded bristle according to one embodiment of the invention.

In an alternate embodiment, the elastomeric bristles include a sheath 30 of thermoplastic elastomer coextruded around a core 32 of a different material, as shown in cross-section in FIG. 4. The sheath to core volume ratio may be from 95:5 to 5:95.

Preferably, the core material is a stiff polymer, allowing the outer sheath to be softer and/or allowing the bristles to have smaller diameters than would otherwise be possible (with a thermoplastic elastomer alone) due to the constraints of bristle durability and strength. If desired the coextruded filaments can have standard bristle diameters, e.g., 5-8 mil. Preferred filament diameters range from 5 to 65 mil, depending on the application in which the bristle is to be used. Suitable core materials include but are not limited to polyamides, e.g., nylons, and polyesters, e.g., PBT.

Preferred sheath materials include the thermoplastic elastomers discussed above. Softer grades of these elastomers can be used when a stiff core is provided, e.g., the sheath material may have a hardness as low as 3 Shore A.

Figure 5:
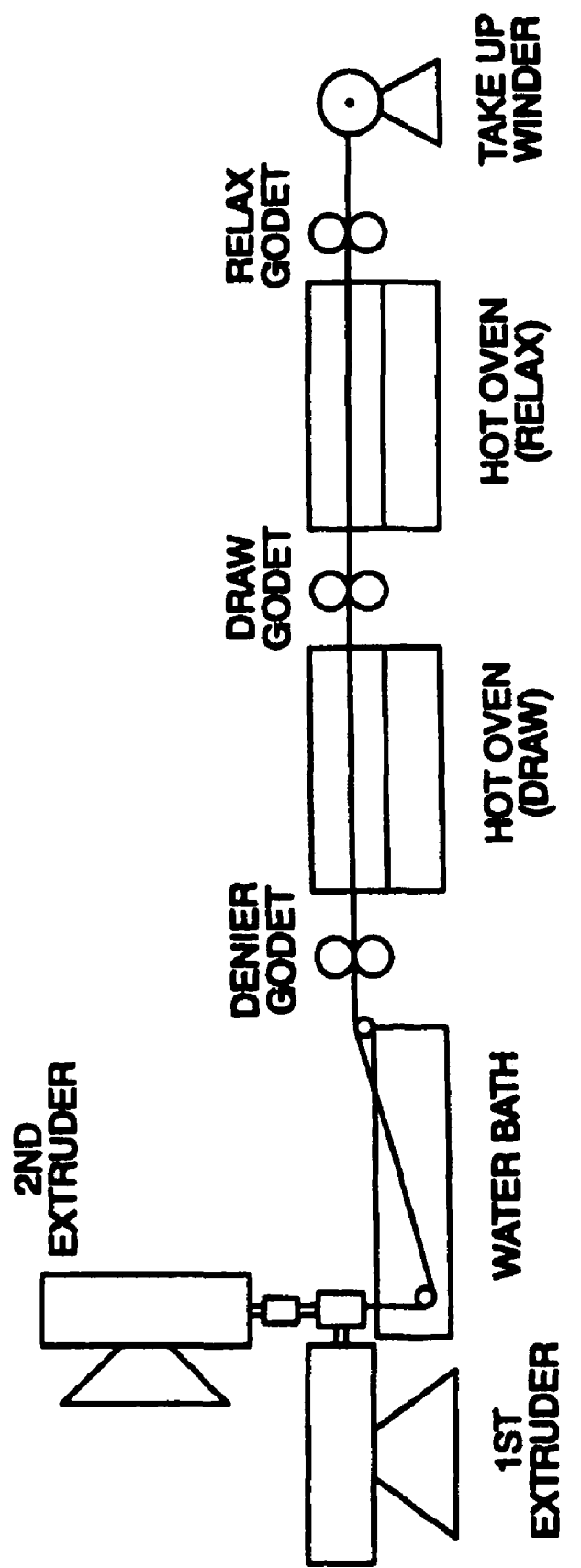
FIG. 5 is a schematic diagram showing a process according to one embodiment of the invention for forming a coextruded filament.

A suitable method for forming the coextruded filaments is shown in FIG. 5. As shown, the two components are extruded through first and second extruders to form a filament, after which the filament is passed through a water bath, and through a series of godets. The filament is placed under light tension as it travels between two drawing godets which are rotating at different speeds. The tension applied to the filament is expressed as the "drawdown ratio", which is the speed differential between the two drawing godets. Preferred drawdown ratios are from about 1.0 to 7.0. The filament then passes through a relaxing godet and is collected on a take-up winder. Suitable coextruded filaments include, but are not limited to, the following:

| Composition (Sheath/Core) | Volume Ratio | Drawdown Rat. | Diameter |
|---|---|---|---|
| PEBAX MX1205/ Nylon 612 | 10:90 | 4:1 | 8 mil |
| PEBAX MX1205/ Nylon 612 | 50:50 | 1:1 or 2:1 | 55 mil |

-continued

| Composition (Sheath/Core) | Volume Ratio | Drawdown Rat. | Diameter |
|---|---|---|---|
| Blend of 90% PEBAX 2533 and 10% DYNAFLEX G6712/Nylon 612 | 10:90 or 50:50 | 4:1<br>1:1 or 2:1 | 8 mil<br>55 mil |
| HYTREL 3078/ Nylon 612 | 10:90 or 50:50 | 4:1<br>1:1 or 2:1 | 8 mil<br>55 mil |

Figure 6:
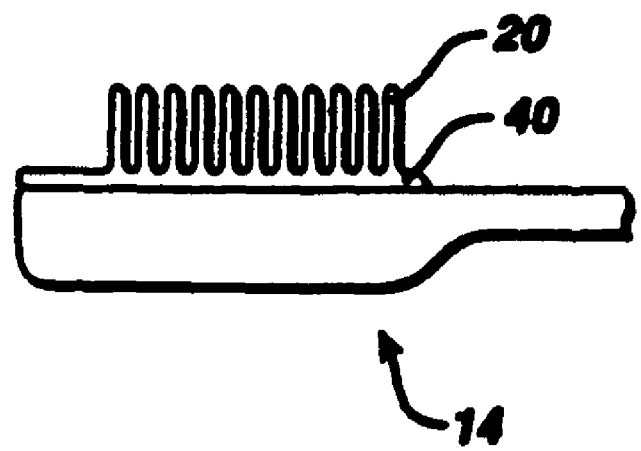
FIGS. 6 and 7 are perspective views of oral brushes having bristles molded.

In an alternate embodiment, head portion 14 includes bristles 20 integrally joined to spacer 40, which is attached to the base of head portion 14, as shown in FIG. 6. Spacer 40 provides good adhesion of bristles 20 to head portion 14 and provides support to bristles 18. The additional support provided by spacer 40 stiffens bristles 18 by decreasing the effective length of the bristles, which allows the incorporation of bristles having smaller diameters that more easily penetrate the interstitial regions of the mouth into the toothbrush. Bristles 18 extend from head portion 14 through spacer 40. Spacer 40 is formed of the elastomeric materials listed above and can be formed of the same elastomeric material as used to form the elastomeric bristles 20. Spacer 40 and elastomeric bristles 20 at the perimeter of head portion 14 can be molded as one unit. If the bristles 20 and spacer 40 are molded as one unit, their diameter is preferably from about 4 mil to about 200 mil. Elastomeric bristles 20 can extend at angles from spacer 40 and can optionally extend from the head portion to a radiused terminal end 71.

Figure 7:
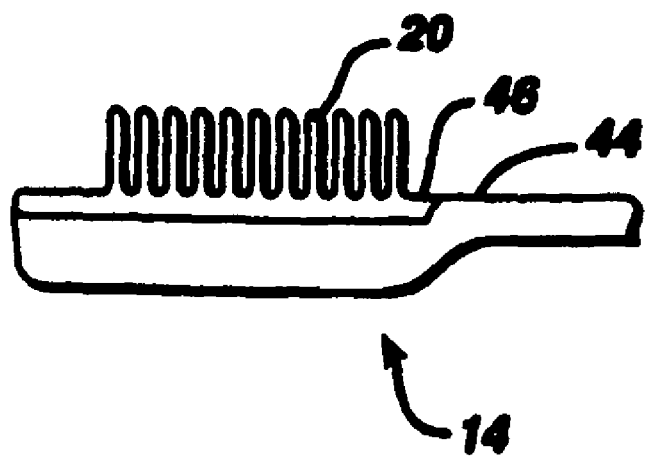

Alternatively, spacer 40 can be recessed into head 14 such that the bristle receiving surface 46 of spacer 40 is substantially contiguous with surface 44 of head portion 14, as shown in FIG. 7.

Other embodiments are within the claims. For example, if desired, all of the bristles may be formed of thermoplastic elastomer material. The bristles may be formed of a blend of thermoplastic elastomers. Moreover, the oral brush may include elastomeric bristles having different relative compositions, e.g., some of the bristles are formed of a first thermoplastic elastomer or blend of elastomers and other bristles are formed of a different thermoplastic elastomer or blend. Further, the elastomeric bristles may include other polymers, e.g., plasticizers such as oils, waxes or resins to increase softness, or additives, e.g., fillers, antioxidants, UV stabilizers, and abrasives or polishing agents. Suitable polishing agents include particles of plastic, particles of walnut shells, particles of hardwood, particles of corn cob, particles of rubber, calcium carbonate, aragonite clay, orthorhombic clays, calcite clay, rhombohedral clays, kaolin clay, bentonite clay, dicalcium phosphate, dicalcium phosphate anhydrous, dicalcium phosphate dihydrate, tricalcium phosphate, calcium pyrophosphate, insoluble sodium metaphosphate, precipitated calcium carbonate, magnesium orthophosphate, trimagnesium phosphate, hydroxyapatites, synthetic apatites, alumina, hydrated alumina, hydrated silica xerogel, metal aluminosilicate complexes, sodium aluminum silicates, zirconium silicate, silicon dioxide, and combinations thereof.

What is claimed is:

1. A toothbrush comprising:
   a body comprising a handle and a head, the head having a recess therein; a top surface; a proximal area adjacent the handle and a distal area disposed away from the handle; a longitudinal axis and a lateral axis, the lateral axis being perpendicular to the longitudinal axis;
   a spacer attached to a portion of the head, the spacer having a first surface and a second surface opposed to the first surface, wherein the spacer is disposed in the recess, and wherein the first surface of the spacer is substantially contiguous with the top surface of the head, wherein the spacer comprises a first material;

a first elastomeric element and a second elastomeric element, the first elastomeric element and the second elastomeric element being laterally spaced apart, wherein the first elastomeric element and the second elastomeric element comprise a second material, and wherein the first material and the second material are different;

at least one cleaning element spaced laterally inboard of at least a portion of the first elastomeric element or at least a portion of the second elastomeric element, wherein the at least one cleaning element extends through the spacer;

a first group of cleaning elements disposed in the distal area, each of the first group of cleaning elements extending away from the first surface of the spacer; and a third elastomeric element comprising a third material which is different from both the first material and the second material.

2. The toothbrush of claim 1, wherein the first elastomeric element and the second elastomeric element are attached to the spacer.

3. The toothbrush of claim 2, wherein the third elastomeric element extends away from the first surface of the spacer.

4. The toothbrush of claim 1, wherein the spacer is elastomeric.

5. The toothbrush of claim 1, wherein the first and second elastomeric elements are molded to the spacer.

6. The toothbrush of claim 1, wherein the third elastomeric element is molded to the spacer.

7. The toothbrush of claim 1, wherein the third elastomeric element is attached to the spacer.

8. The toothbrush of claim 1, wherein the first, second, and third elastomeric elements comprise styrene-ethylene-butylene-styrene block copolymers.

9. The toothbrush of claim 1, wherein the first and second elastomeric elements have a Shore A hardness of at least 30.

10. The toothbrush of claim 1, wherein the first and second elastomeric elements have a flexural modulus of from about 5 to 100 MPa.

11. The toothbrush of claim 1, wherein the first and second elastomeric elements comprise a mixture of elastomeric and non-elastomeric polymers.

12. The toothbrush of claim 1, wherein the first and second elastomeric elements comprise an abrasive.

13. The toothbrush of claim 1, wherein an axis of the handle resides in a first plane and an axis of the head resides in a second plane, wherein the first plane and the second plane are different.

14. The toothbrush of claim 1, wherein the first and second elastomeric elements include a polishing agent.

15. The toothbrush of claim 1, wherein the at least one cleaning element comprises a bristle tuft.

16. The toothbrush of claim 1, wherein the toothbrush is an electric toothbrush.

17. The toothbrush of claim 1, wherein the head is integral with the handle and the spacer is attached to the head.

18. A toothbrush comprising:
a body having a handle and a head, the head having a recess therein, a top surface, and a longitudinal axis;
a spacer disposed in the recess, the spacer having a first surface and a second surface opposed to the first surface, wherein the first surface of the spacer is substantially contiguous with the top surface of the head, the spacer comprising a first material;

a plurality of bristle tufts extending away from the first surface of the spacer, each of the plurality of bristle tufts extending through the spacer; and a first plurality of elastomeric elements extending away from the first surface of the spacer, the first plurality of elastomeric elements comprising a second material, wherein the first material and the second material are different; and a second plurality of elastomeric elements extending away from the first surface of the spacer, wherein the second plurality of elastomeric elements are longitudinally spaced from the first plurality of elastomeric elements, wherein at least some of the plurality of bristle tufts are longitudinally spaced from the first plurality of elastomeric elements or the second plurality of elastomeric elements, wherein the second plurality of elastomeric elements comprises the second material; and a third plurality of elastomeric elements comprising a third material which is different from both the first material and the second material.

19. The toothbrush of claim 18, wherein the third plurality of elastomeric elements extends away from the first surface of the spacer.

20. The toothbrush of claim 18, wherein the spacer is elastomeric.

21. The toothbrush of claim 18, wherein the first plurality of elastomeric elements and second plurality of elastomeric elements are molded to the spacer.

22. The toothbrush of claim 18, wherein the third plurality of elastomeric elements is molded to the spacer.

23. The toothbrush of claim 18, wherein the first plurality of elastomeric elements and second plurality of elastomeric elements are attached to the spacer.

24. The toothbrush of claim 18, wherein the third plurality of elatomeric elements is attached to the spacer.

25. The toothbrush of claim 18, wherein the first plurality of elastomeric elements and/or second plurality of elastomeric elements comprise styrene-ethylene-butylene-styrene block copolymers.

26. The toothbrush of claim 18, wherein the first plurality of elastomeric elements and/or second plurality of elastomeric elements have a Shore A hardness of at least 30.

27. The toothbrush of claim 18, wherein the first plurality of elastomeric elements and/or second plurality of elastomeric elements have a flexural modulus of from about 5 to 100 MPa.

28. The toothbrush of claim 18, wherein the first plurality of elastomeric elements and/or second plurality of elastomeric elements comprise a mixture of elastomeric and non-elastomeric polymers.

29. The toothbrush of claim 18, wherein the first plurality of elastomeric elements and second plurality of elastomeric elements comprise an abrasive.

30. The toothbrush of claim 18, wherein an axis of the handle resides in a first plane and an axis of the head resides in a second plane, wherein the first plane and the second plane are different.

31. The toothbrush of claim 18, wherein the first plurality of elastomeric elements and/or second plurality of elastomeric elements include a polishing agent.

32. The toothbrush of claim 18, wherein the head is integral with the handle and the spacer is attached to the head.

33. The toothbrush of claim 18, wherein the toothbrush is an electric toothbrush.

34. A toothbrush comprising:
a body having a handle and a head, the head having a recessed area and a top surface adjacent to the recessed area;
a spacer attached to the head, wherein the spacer is disposed in the recessed area in the head, wherein the spacer includes a first surface and a second surface opposite the first surface, and wherein the top surface of the head is substantially contiguous with the first surface of the spacer, the spacer comprising a first material;
a plurality of bristle tufts extending away from the first surface of the spacer and extending through the spacer;
a plurality of elastomeric elements extending away from the first surface of the spacer, wherein the plurality of elastomeric elements includes a first pair of elastomeric elements, a second pair of elastomeric elements, and a third pair of elastomeric elements, an elastomeric element of each pair being laterally spaced apart from another elastomeric element of the respective pair, wherein the plurality of elastomeric elements comprises a second material which is different than the first material, and wherein the first pair, the second pair, and the third pair are longitudinally spaced apart; and
a second plurality of elastomeric elements comprising a third material, wherein the third material is different from both the first material and the second material.

35. The toothbrush of claim 34, wherein the second plurality of elastomeric elements extends away from the first surface of the spacer.

36. The toothbrush of claim 34, wherein the spacer is elastomeric.

37. The toothbrush of claim 34, wherein the plurality of elastomeric elements elements is molded to the spacer.

38. The toothbrush of claim 34, wherein the second plurality of elastomeric elements is molded to the spacer.

39. The toothbrush of claim 34, wherein the plurality of elastomeric elements is attached to the spacer.

40. The toothbrush of claim 34, wherein the second plurality of elatomeric elements is attached to the spacer.

41. The toothbrush of claim 34, wherein the plurality of elastomeric elements and/or second plurality of elastomeric elements comprise styrene-ethylene- butylene-styrene block copolymers.

42. The toothbrush of claim 34, wherein the plurality of elastomeric elements have a Shore A hardness of at least 30.

43. The toothbrush of claim 34, wherein the plurality of elastomeric elements have a flexural modulus of from about 5 to 100 MPa.

44. The toothbrush of claim 34, wherein the plurality of elastomeric elements and/or second plurality of elastomeric elements comprise a mixture of elastomeric and non-elastomeric polymers.

45. The toothbrush of claim 34, wherein the plurality of elastomeric elements and/or second plurality of elastomeric elements comprise an abrasive.

46. The toothbrush of claim 34, wherein an axis of the handle resides in a first plane and an axis of the head resides in a second plane, wherein the first plane and the second plane are different.

47. The toothbrush of claim 34, wherein the plurality of elastomeric elements and/or second plurality of elastomeric elements include a polishing agent.

48. The toothbrush of claim 34, wherein the head is integral with the handle and the spacer is attached to the head.

49. The toothbrush of claim 34, wherein the toothbrush is an electric toothbrush.

50. The toothbrush of claim 34, wherein the plurality of elastomeric elements surround the plurality of bristle tufts.

51. A toothbrush comprising:
a body comprising a handle and a head, the head having a longitudinal axis and a lateral axis, the head further comprising a spacer attached to a portion of the head, the spacer having a first surface and a second surface opposite the first surface, the spacer being disposed in a recess in the head such that the first surface of the spacer is substantially contiguous with a top surface of the head, wherein the spacer comprises a first material; a plurality of non-elastomeric cleaning elements each extending through the spacer; and a first pair of elastomeric elements being longitudinally spaced from one another; a second pair of elastomeric elements being longitudinally spaced from one another, the first pair of elastomeric elements and the second pair of elastomeric elements being laterally spaced apart, wherein the first and second pairs of elastomeric elements comprise a second material which is different than the first material, and wherein at least one of the plurality of non-elastomeric cleaning elements is disposed laterally between the first pair of elastomeric elements and the second pair of elastomeric elements; and the toothbrush further comprising a third pair of elastomeric elements comprising a third material, wherein the third material is different from the second material and the first material.

52. The toothbrush of claim 51, wherein the spacer is elastomeric.

53. The toothbrush of claim 51, wherein the first pair and the second pair of elastomeric elements are molded to the spacer.

54. The toothbrush of claim 51, wherein the third pair of elastomeric elements is molded to the spacer.

55. The toothbrush of claim 51, wherein the first pair and the second pair of elastomeric elements are attached to the spacer.

56. The toothbrush of claim 51, wherein the third pair of elatomeric elements is attached to the spacer.

57. The toothbrush of claim 51, wherein the first pair, second pair, and/or third pair of elastomeric elements comprise styrene-ethylene-butylene-styrene block copolymers.

58. The toothbrush of claim 51, wherein the first pair and/or the second pair of elastomeric elements have a Shore A hardness of at least 30.

59. The toothbrush of claim 51, wherein the first pair and/or the second pair of elastomeric elements have a flexural modulus of from about 5 to 100 MPa.

60. The toothbrush of claim 51, wherein the first pair of elastomeric elements and/or second pair of elastomeric elements comprise a mixture of elastomeric and non-elastomeric polymers.

61. The toothbrush of claim 51, wherein the first pair of elastomeric elements and/or second pair of elastomeric elements comprise an abrasive.

62. The toothbrush of claim 51, wherein an axis of the handle resides in a first plane and an axis of the head resides in a second plane, wherein the first plane and the second plane are different.

63. The toothbrush of claim 51, wherein the first pair of elastomeric elements and/or second pair of elastomeric elements include a polishing agent.

64. The toothbrush of claim 51, wherein the head is integral with the handle and the spacer is attached to the head.

65. The toothbrush of claim 51, wherein the toothbrush is an electric toothbrush.

66. The toothbrush of claim 51, wherein the third pair of elastomeric elements extend away from the first surface of the spacer.

67. A toothbrush comprising:
a body having a handle and a head, the head having a recessed area and a top surface adjacent to the recessed area;
a spacer attached to the head, wherein the spacer is disposed in the recessed area in the head, wherein the spacer includes a first surface and a second surface opposite the first surface, and wherein the top surface of the head is substantially contiguous with the first surface of the spacer comprising a spacer material;
a plurality of bristle tufts extending away from the first surface of the spacer and extending through the spacer; and
a first plurality of elastomeric elements comprising a first material, the first plurality of elastomeric elements being attached to the spacer; and
a second plurality of elastomeric elements comprising a second material which is different than the first material and each of which is different than the spacer material.

68. The toothbrush of claim 67, wherein the spacer material comprises an elastomeric material.

69. The toothbrush of claim 67, wherein the first plurality of elastomeric elements are molded to the spacer.

70. The toothbrush of claim 67, wherein the second plurality of elastomeric elements are molded to the spacer.

71. The toothbrush of claim 67, wherein the first plurality and/or second plurality of elastomeric elements comprise styrene-ethylene-butylene-styrene block copolymers.

72. The toothbrush of claim 67, wherein the first pluratlity and/or the second plurality of elastomeric elements have a Shore A hardness of at least 30.

73. The toothbrush of claim 67, wherein the first plurality and/or the second plurality of elastomeric elements have a flexural modulus of from about 5 to 100 MPa.

74. The toothbrush of claim 67, wherein the first plurality and/or the second plurality of elastomeric elements comprise a mixture of elastomeric and non-elastomeric polymers.

75. The toothbrush of claim 67, wherein the first plurality and/or the second plurality of elastomeric elements comprise an abrasive.

76. The toothbrush of claim 67, wherein an axis of the handle resides in a first plane and an axis of the head resides in a second plane, wherein the first plane and the second plane are different.

77. The toothbrush of claim 67, wherein the first plurality and/or the second plurality of elastomeric elements include a polishing agent.

78. The toothbrush of claim 67, wherein the head is integral with the handle and the spacer is attached to the head.

79. The toothbrush of claim 67, wherein the toothbrush is an electric toothbrush.

80. The toothbrush of claim 67, wherein the second plurality of elastomeric elements extend away from the first surface of the spacer.

81. A toothbrush comprising:
a body comprising a handle and a head, the head having a recess therein; a top surface; a proximal area adjacent the handle and a distal area disposed away from the handle; and a periphery;
a spacer attached to a portion of the head, the spacer having a first surface and a second surface opposed to the first surface, wherein the spacer is disposed in the recess, and wherein the first surface of the spacer is substantially contiguous with the top surface of the head;
a plurality of elastomeric elements disposed in a row along and adjacent the periphery of the head; and
a plurality of non-elastomeric cleaning elements disposed adjacent the periphery of the head, wherein the plurality of non-elastomeric elements and the plurality of elastomeric elements are alternatingly arranged within the same row, and wherein the plurality of non-elastomeric cleaning elements extend through the spacer.

82. The toothbrush of claim 81, wherein the spacer is elastomeric.

83. The toothbrush of claim 81, wherein the plurality of elastomeric elements are molded to the spacer.

84. The toothbrush of claim 81, wherein the plurality of elastomeric elements have a Shore A hardness of at least 30.

85. The toothbrush of claim 81, wherein the plurality of elastomeric elements comprise a mixture of elastomeric and non-elastomeric polymers.

86. The toothbrush of claim 81, wherein the plurality of elastomeric elements comprise an abrasive.

87. The toothbrush of claim 81, wherein an axis of the handle resides in a first plane and an axis of the head resides in a second plane, wherein the first plane and the second plane are different.

88. The toothbrush of claim 81, wherein the toothbrush is an electric toothbrush.

89. The toothbrush of claim 81, wherein the head is integral with the handle and the spacer is attached to the head.

90. The toothbrush of claim 81, further comprising a second plurality of elastomeric elements, wherein the plurality of elastomeric elements comprise a first material and the second plurality of elastomeric elements comprise a second material, and wherein the first material and the second material are different.

91. The toothbrush of claim 90, wherein the second plurality of elastomeric elements are molded to the spacer.

92. The toothbrush of claim 81, further comprising a second plurality of elastomeric elements, wherein the plurality of elastomeric elements comprise a first material and the second plurality of elastomeric elements comprise the first material.

93. The toothbrush of claim 92, wherein the second plurality of elastomeric elements are molded to the spacer.

94. The toothbrush of claim 81, wherein the second plurality of elastomeric element extends away from the first surface of the spacer.

* * * * *